United States Patent [19]

Sugihara

[11] 4,198,663
[45] Apr. 15, 1980

[54] DIGITAL SIGNAL RECORDING SYSTEM

[75] Inventor: Yasumasa Sugihara, Kawasaki, Japan

[73] Assignee: The General Corporation, Japan

[21] Appl. No.: 903,695

[22] Filed: May 8, 1978

[30] Foreign Application Priority Data

May 7, 1977 [JP] Japan ................................. 52-52354

[51] Int. Cl.² ............................................. G11B 5/09
[52] U.S. Cl. ......................................... 360/40; 360/51
[58] Field of Search ........................... 360/40, 42, 51

[56] References Cited

U.S. PATENT DOCUMENTS

| | | | |
|---|---|---|---|
| 3,418,585 | 12/1968 | Harnett | 360/42 |
| 3,636,536 | 1/1972 | Norris | 360/42 |
| 3,815,122 | 6/1974 | Schwartz et al. | 360/40 |
| 4,027,335 | 5/1977 | Miller | 360/40 |

*Primary Examiner*—Vincent P. Canney
*Attorney, Agent, or Firm*—Robert E. Burns; Emmanuel J. Lobato; Bruce L. Adams

[57] ABSTRACT

A digital signal recording system capable of a self-clocking and a peak detection. Binary data is represented by bi-level signal pulses which are spaced apart by a time interval which is a positive integral multiple of time interval of clock pulses (referred to as $T_0$). The width of the signal pulses at their one level is a constant value less than $T_0$ and where the time spacing between such signal pulses is greater than $2 T_0$, a selected number of pseudo pulses having the same pulse width as such signal pulses are inserted between the adjacent signal pulses with a time interval therefrom which is an odd multiple of $T_0/2$.

2 Claims, 5 Drawing Figures

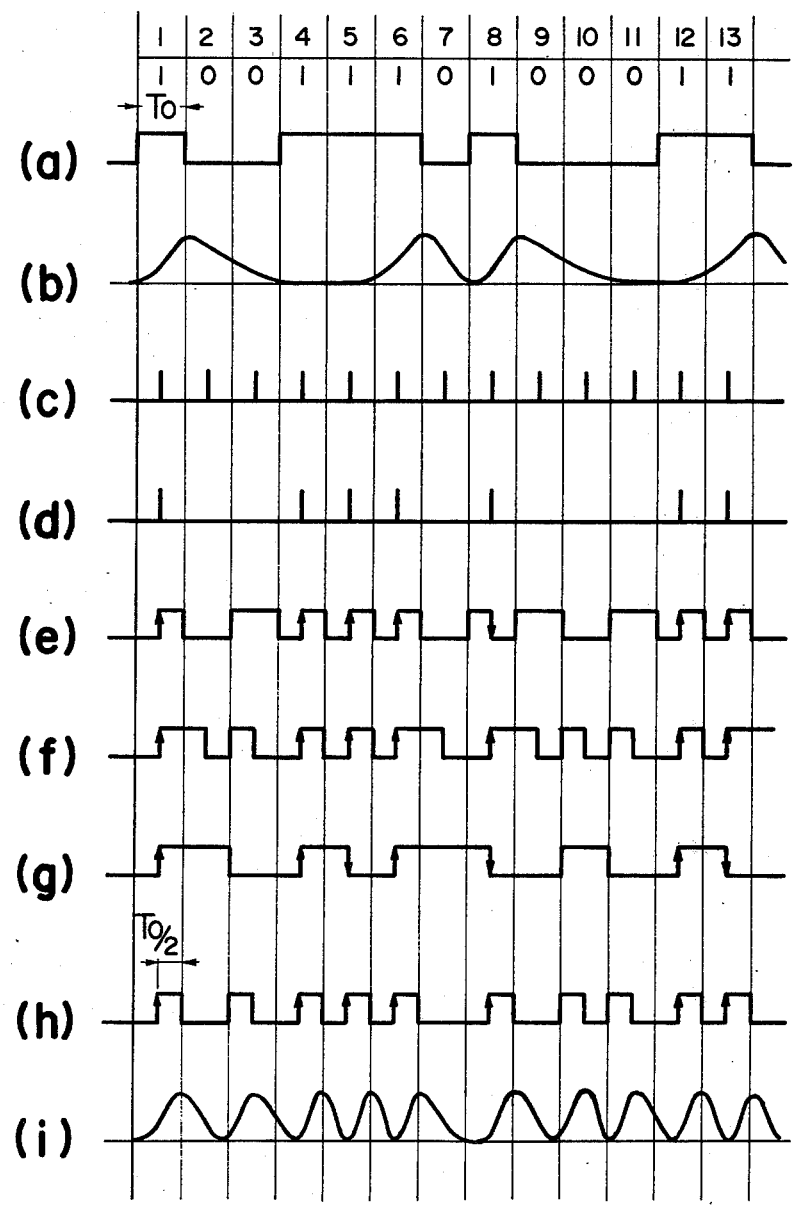

DIGITAL SIGNAL RECORDING SYSTEM

BACKGROUND OF THE INVENTION

The invention relates to a digital signal recording system, and more particularly, to a system in which digital signals are modulated in a manner to permit a self-clocking and a peak detection.

When recording digital signals on a carrier, they may be directly recorded without change in their form, or alternatively they may be modulated before they are recorded. When the recording medium is a magnetic tape or disc, the latter procedure is commonly employed. A variety of recording systems are known in this instance. Typical techniques include a return-to-zero (RZ) scheme, a non-return-to-zero (NRZ) scheme, a non-return-to-zero inverted (NRZI) scheme, a frequency modulation (FM) scheme, a phase modulation (PM) scheme, and a modified frequency modulation (MFM) scheme. Each of these schemes is well known and will not be specifically dealt with. However, it is to be noted that they selectively exhibit various features relating to the self-clocking capability, recording density, frequency band, peak detection capability or the like. It is therefore important to determine a most suitable recording system when recording digital signals, taking into consideration the kind of a carrier being used and the signals to be recorded.

However, it is found that with certain carriers, inconvenience may be caused when recording signals according to a known recording system. Specifically, this occurs when signals are recorded on a carrier in the form of grooves formed in physically deformable surface areas. A system which employs such carrier to reproduce stored signals therefrom is disclosed in West Germany Laid-Open Patent Application (DE-OS) No. P 2 024 539 or "JOURNAL OF THE SMPTE" Vol. 8, pages 303-304, issued April 1972. A signal is recorded in the carrier in the form of a groove in the carrier surface, and during the reproduction, a scanner runs along a given track of the carrier. A scanning surface of the scanner is substantially fixed in position in the direction of the reaction force produced by the carrier surface so that a deformed portion which lies therebelow exerts a pressure upon the scanning surface, with a change in such pressure or force being converted into an electrical quantity. With this recording and reproducing system, it is possible to derive from the carrier, in the form of a disc, frequencies which are substantially higher than the frequency band usually available from a common hard record disc, so that it can be advantageously used for the recording of a wide band video signal in addition to the acoustic signal. If digital signals can be recorded on such disc, the voice signal can then be recorded according to a pulse code modulation scheme which enables the reproduction with a high fidelity, with the possibility of recording a multi-channel voice signal as a time division multiplex PCM signal. However, the prior art failed to achieve such result when utilizing the known recording schemes. The reason therefor will be discussed below with reference to FIG. 1.

FIG. 1 shows a known reproducing unit of pressure scanning type, which includes a mechanical-electrical transducer 1 comprising a piezoelectric ceramic material, and a slide tip 2 of diamond which is secured to the transducer 1 by means of adhesive 3. The tip 2 is adapted to contact the surface of a carrier disc 4, in which a deformation corresponding to a time varying signal is formed in the form of a groove. As the disc 4 moves in a direction indicated by an arrow, the unit is subjected to a change in pressure which is related to the stored signal in the carrier 4. By scanning the carrier surface such as that shown in FIG. 1, there can be reproduced a sinusoidal wave as shown in FIG. 2.

FIG. 3(a) shows a digital signal comprising thirteen bits 1001110100011 which may be directly recorded in the carrier 4. FIG. 3(b) shows an output waveform which may be reproduced from the recorded signal by the reproducing unit. Where adjacent bit cells have binary one in succession as indicated in cells 4 and 5 and cells 12 and 13, the bits cannot be reproduced except for the last one in the succession. As a consequence, a digital signal must be recorded in the carrier by recording a modulated version thereof. Where a signal is recorded on a single track of the disc, an arrangement must be made to enable a self-clocking operation during the reproduction. Since jitter is involved with a change in the number of revolutions of the disc, it is necessary to provide clock pulses which include components corresponding to the jitter contained in the reproduced signal in order to avoid the absence of clock information over a prolonged portion of the reproduced signal. Also, since it is difficult to discriminate information based on the amplitude of the reproduced signal, it is desirable to adopt a peak detection system to discriminate information on the basis of the presence or absence of a peak, which can be detected by differentiation of the output waveform since the gradient is null at the peak.

Three recording systems including FM, PM and MFM are available to satisfy the need of a disc in general including a magnetic disc. FIGS. 3(e), (f) and (g) show waveforms which result from the modulation of the digital signal shown in FIG. 3(a) according to FM, PM and MFM schemes, respectively. These schemes do not lend themselves or are dissatisfactory to a certain kind of discs as mentioned above. It will be understood that FIG. 3(c) shows clock pulses while FIG. 3(d) shows bit pulses. When a pressure scanning, reproducing unit is used, the slide tip causes an elastic deformation of hills formed in the disc surface, which causes a large change in the electrical signal to be produced during the movement of the carrier when it is released from an edge of the slide tip which is formed at an angle of nearly 90°. As a consequence, information must be consistently present at either one of the rising or falling end of the pulses. By observation of FIGS. 3(e), (f) and (g) where the position of information is conveniently indicated by arrows, it will be readily apparent that the FM and MFM schemes are inadequate for the reasons mentioned above. In this respect, it is seen that the PM scheme is favourable in that it provides a consistent positioning of information, but it suffers from another disadvantage. Specifically, representing the period of a clock pulse by $T_0$, the pulse width of PM wave will be of two kinds, one having $T_0$ and another $T_0/2$. This results in a displacement of the signal peak from an accurate position in time if the signal transmission system includes a portion of a reduced frequency band. The consequence is the introduction of extraneous signal or a drop-out of necessary signal when the detected peak signal is ANDed with the clock pulse.

SUMMARY OF THE INVENTION

In view of the fact that digital signals cannot be recorded on a certain kind of carrier using the known recording systems, it is an object of the invention to provide a novel digital signal recording system which is applicable to such carrier. However, it should be understood that while the invention achieves a particular effect with a particular kind of carrier, the invention is in no way limited to the use of such carrier, but is applicable to and useful with more common carriers such as magnetic tapes and discs and also including various other kinds of carriers adapted to the recording of a video signals, as disclosed in U.S. Pat. Nos. 3,842,194; 3,381,086 and 3,855,426.

It is another object of the invention to provide a digital signal recording system in which when a digital signal is modulated in a manner to permit a self-clocking operation and a peak detection during the reproduction, it is modulated so as to provide a constant pulse width of the modulated signal, thereby consistently defining the position of information at the rising and the falling end of the pulses.

In accordance with the invention, there is provided a digital signal recording system in which binary data is represented by bi-level signal pulses which are spaced apart by a time interval which is a positive integral multiple of the period of the clock pulse ($T_0$) and in which one level of the signal pulse is indicated by a constant pulse width less than $T_0$ and wherein whenever the signal pulses are spaced apart by more than $2T_0$, a selected number of pseudo pulses having the same pulse width are inserted between adjacent signal pulses and are spaced from the latter by a time interval which is an odd multiple of $T_0/2$.

In a preferred embodiment of the invention, one level of the signal pulse has a pulse width which is fixed at $T_0/2$. However, any length less than $T_0$ may be chosen, concommitant with the requirement for discrimination of the two levels.

In accordance with the invention, a digital signal containing desired information is modulated into a pulse train which comprises a combination of signal pulses and pseudo pulses. Same information is contained at the rising and the falling end of the signal pulse. In particular, each pulse has a constant width, and the pulses are spaced apart by a time interval which is less than $2T_0$, so that the self-clocking operation and the generation of clock pulses including jitters are facilitated during the reproduction.

With the novel recording system, a reproducing unit of pressure scanning type can be used to reproduce a digital signal from a carrier in which it is stored in the form of physically deformable surface areas. This process is illustrated in FIGS. 3(h) and (i), showing the modulated waveform and the read-out waveform, respectively. It is a simple matter for one skilled in the art to derive clock pulses shown in FIG. 3(c) from this read-out waveform. By passing the waveform (i) and the clock pulse (c) through an AND gate, the original digital signal which does not contain pseudo pulses can be demodulated.

BRIEF DESCRIPTION OF THE DRAWINGS

FIGS. 3(a) to (i) graphically show various waveforms which are useful in understanding the background and the operation of the invention;

DESCRIPTION OF PREFERRED EMBODIMENT

Figure 1:
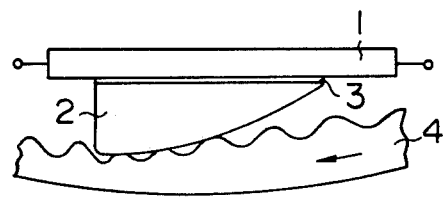
FIG. 1 is a schematic illustration of a carrier in which a signal is stored in the form of physically deformable surface areas and also illustrating a reproducing unit of pressure scanning type which reproduces a signal from the carrier.
Figure 2:
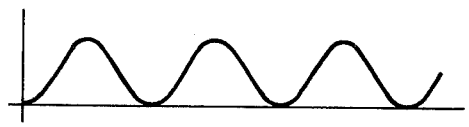
FIG. 2 is a graphical illustration of a waveform which may be derived by the unit shown in FIG. 1.
Figure 4:
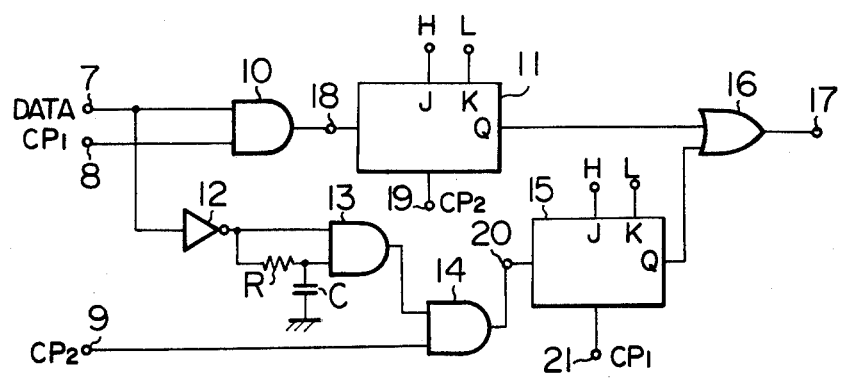
FIG. 4 is a block diagram of an embodiment of the recording system according to the invention.

Referring to FIG. 4, there is shown an embodiment of the invention. The system utilizes two sets of clock pulses which are phase displaced 180° from each other. Data is applied to input terminal 7 and thence to one input of AND circuit 10, the other input of which receives a first clock pulse $CP_1$ which is supplied to input terminal 8. An output of circuit 10 feeds a clock terminal 18 of J-K flipflop circuit 11 having its J-terminal connected with HIGH and K-terminal connected with LOW potentials and having its clear terminal 19 supplied with a second clock pulse $CP_2$. The flipflop circuit has an output terminal Q which is connected with one input of OR circuit 16. Data is also fed through NOT circuit 12 to another AND circuit 13. It will be seen that an output from NOT circuit 12 is also fed to AND circuit 13 through an integrator comprising resistor R and capacitor C. The output of AND circuit 13 is fed to a further AND circuit 14, the other input of which receives a second clock pulse $CP_2$ from input terminal 9, the logical product of the both inputs being fed to a clock terminal 20 of another J-K flipflop circuit 15. Circuit 15 has its J-terminal connected with HIGH and its K-terminal connected with LOW and its clear terminal 21 connected to receive the first clock pulse $CP_1$. The output terminal Q of circuit 15 is fed to another input of OR circuit 16, the output of which is delivered to an output terminal 17.

Figure 5:
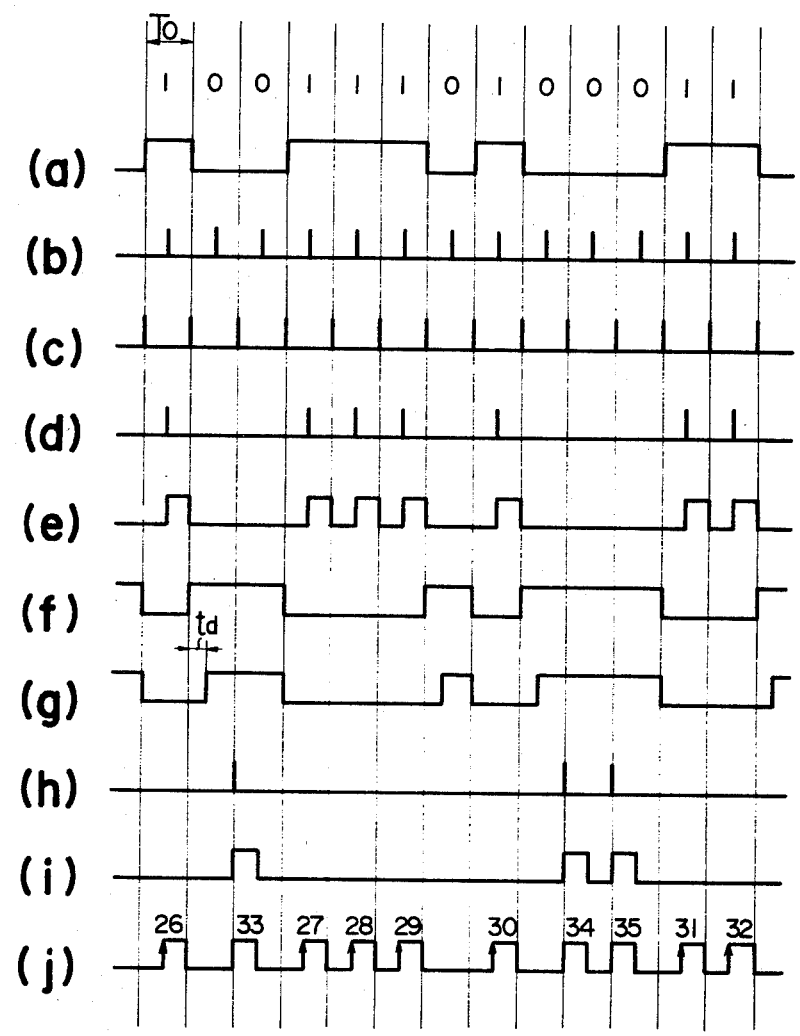
FIG. 5 graphically shows various waveforms appearing in the circuit shown in FIG. 4.

The operation of the circuit arrangement shown in FIG. 4 will now be described with reference to FIG. 5. Assume that data comprising thirteen bits (1001110100011) shown in FIG. 5(a) is applied to input terminal 7 while first and second clock pulses shown in FIGS. 5(b) and (c) are applied to input terminals 8, 9, respectively. When data (a) and $CP_1$(b) are applied to AND circuit 10, an output as shown in FIG. 5(d) is produced at its output terminal, which is thence applied to clock terminal 18 of flipflop 11, the clear terminal 19 of which is supplied with the second clock pulse as shown in FIG. 5(c). When J- and K-terminals are connected with HIGH and LOW, respectively, an output shown in FIG. 5(e) is produced at its Q output terminal. When data input from terminal 7 is applied to NOT circuit 12, a waveform shown in FIG. 5(f) is produced at its output terminal, which is directly applied to one input of AND circuit 13 and to the other input thereof through the integrator comprising resistance R and capacitor C which define a suitable integrator constant. Thereupon, a waveform shown in FIG. 5(g) is produced at its output terminal which has its rising end slightly delayed and has its falling end coincident with the corresponding end of the waveform (f). The purpose of the time delay td is to prevent a clock pulse which coincides with the rising end from being extracted by AND circuit 14, which would occur if the output of NOT circuit 12 is directly applied as a gating pulse thereto.

The magnitude of the time delay td must be less than $T_0$. When the waveform (g) and the second clock pulse (c) are supplied to AND circuit 14, a pulse shown in FIG. 5(h) is produced at its output terminal. The pulse (h) is applied to the clock terminal 20 of flipflop 15 while the first clock pulse (b) is applied to the clear terminal 21 thereof. When the J-terminal and K-terminal are connected with HIGH and LOW, respectively, a pulse train shown in FIG. 5(i) results at its output terminal Q. When the pulse trains (e) and (i) are applied to OR circuit 16, there is obtained a pulse train shown in FIG. 5(j) at the output terminal 17, which is the intended modulated waveform. In the present example, each pulse has a constant width equal to $T_0/2$. For reason of convenience, the waveform (j) includes arrows which indicate information bearing pulses, which correspond to "1" data shown in FIG. 5(a). Since the pulse width is constant, the rising or the falling end alone may be utilized to derive the data shown in FIG. 5(a). Reference numerals 33, 34 and 35 represent pseudo pulses which have been inserted to enable a self-synchronization of the bits and to provide a stable operation against jitters. It will be seen that signal pulses which contain information are spaced by a time interval which is an even multiple of $T_0/2$ while the pseudo pulse 33 is spaced from signal pulses 26, 27 by a time interval which is an odd multiple of $T_0/2$, and pseudo pulses 34, 35 are spaced from signal pulses 30, 31 by a time interval which is an odd multiple of $T_0/2$. The difference in the time interval can be utilized in a demodulator circuit to remove the pseudo pulses 33 to 35, allowing only the signal pulses to be outputted. While the interval between signal pulses 29 and 30 is equal to $2T_0$, there can be no interval between the pulses of the modulated wave which is greater than $2T_0$, thus assuring a stabilized self-synchronization of the bits. Since the pulse width is constant, an output from the pickup has a waveform as shown in FIG. 3(i) which facilitates the retrieval of information.

What is claimed is:

1. A digital signal modulation circuit comprising: an AND circuit having one input for receiving data signals and another input for receiving first clock pulse signals, a J-K flipflop circuit having its clock terminal connected to receive the output of said AND circuit and having a clear terminal connected to receive second clock pulse signals which are phase displaced 180° from said first clock pulse signals, a NOT circuit having an input for receiving the data signals, a gate pulse forming circuit connected to the output of said NOT circuit to receive therefrom inverted data signals and responsive to only the rising end of the inverted data signals for producing time-delayed gate pulse signals which are delayed by a time interval less than the period of the clock pulse signals, another AND circuit having one input connected to receive the time-delayed gate pulse signals and another input for receiving the second clock pulse signals, another J-K flipflop circuit having its clock terminal connected to the output of said another AND circuit and having its clear terminal connected to receive the first clock pulse signals, and an OR circuit connected to receive the output signals from both said J-K flipflop circuits.

2. A digital signal modulation circuit according to claim 1 in which said gate pulse forming circuit comprises an integrator connected to the output of said NOT circuit for integrating the inverted data signals, and an AND circuit having one input connected to the output of said integrator and another input connected to the output of said NOT circuit.

* * * * *